US012488913B2

(12) United States Patent
Hatton et al.

(10) Patent No.: US 12,488,913 B2
(45) Date of Patent: Dec. 2, 2025

(54) GUARDED COAXIAL CABLE ASSEMBLY

(71) Applicant: HOLLAND ELECTRONICS, LLC, Ventura, CA (US)

(72) Inventors: Scott Hatton, Fillmore, CA (US); Michael Holland, Santa Barbara, CA (US)

(73) Assignee: Holland Electronics, LLC, Ventura, CA (US)

( * ) Notice: Subject to any disclaimer, the term of this patent is extended or adjusted under 35 U.S.C. 154(b) by 0 days.

(21) Appl. No.: 18/372,327

(22) Filed: Sep. 25, 2023

(65) Prior Publication Data

US 2024/0013951 A1 Jan. 11, 2024

Related U.S. Application Data

(63) Continuation of application No. 16/594,785, filed on Oct. 7, 2019, now Pat. No. 11,810,690, which is a continuation of application No. 15/249,446, filed on Aug. 28, 2016, now Pat. No. 10,438,727, which is a continuation of application No. 14/269,105, filed on May 3, 2014, now Pat. No. 9,431,151, which is a continuation of application No. 13/668,260, filed on Nov. 3, 2012, now Pat. No. 8,772,640, which is a (Continued)

(51) Int. Cl.

| | |
|---|---|
| ***H01B 11/18*** | (2006.01) |
| ***H01B 7/08*** | (2006.01) |
| ***H01B 7/18*** | (2006.01) |
| ***H01B 13/016*** | (2006.01) |
| ***H01R 24/54*** | (2011.01) |
| ***H01R 43/28*** | (2006.01) |
| ***H01R 103/00*** | (2006.01) |

(52) U.S. Cl.

CPC ....... *H01B 11/1895* (2013.01); *H01B 7/0823* (2013.01); *H01B 7/0869* (2013.01); *H01B 7/18* (2013.01); *H01B 13/016* (2013.01); *H01R 24/54* (2013.01); *H01R 43/28* (2013.01); *H01R 2103/00* (2013.01)

(58) Field of Classification Search

CPC .............. H01B 11/1895; H01B 13/016; H01B 7/0823; H01B 7/0869; H01B 7/18; H01B 7/08; H01B 11/18; H01B 11/1869; H01B 11/203; H01R 2103/00; H01R 103/00; H01R 24/54; H01R 43/28

USPC ...... 174/117 F, 117 FF, 106 R, 107; 439/578

See application file for complete search history.

(56) References Cited

U.S. PATENT DOCUMENTS 2,136,865 A * 11/1938 Reed .................... D07B 1/0686 57/220

2,950,338 A 8/1960 Taylor (Continued)

FOREIGN PATENT DOCUMENTS

EP 0208178 A1 * 1/1987 ............... H01B 7/04

GB 2098043 A 4/1982

(Continued)

OTHER PUBLICATIONS

Design of Steel Structures_pp. 2 to 34_Oct. 2006.*

*Primary Examiner* — Timothy J Thompson
*Assistant Examiner* — Guillermo J Egoavil
(74) *Attorney, Agent, or Firm* — Paul Chancellor; Ocean Law

(57) ABSTRACT

A guarded coaxial cable assembly includes a micro-coaxial cable and a metal rail for protecting the micro-coaxial cable from harmful compression.

2 Claims, 8 Drawing Sheets

Related U.S. Application Data continuation of application No. 12/634,293, filed on Dec. 9, 2009, now Pat. No. 8,308,505.

(56) References Cited

U.S. PATENT DOCUMENTS

| | | | | |
|---|---|---|---|---|
| 3,816,818 | A * | 6/1974 | Meier | H01R 12/675 439/492 |
| 4,345,112 | A * | 8/1982 | Sugata | H01B 7/1875 174/109 |
| 4,404,425 | A | 9/1983 | Rich | |
| 4,419,538 | A | 12/1983 | Hansell | |
| 4,864,632 | A | 9/1989 | Moriyama | |
| 5,603,888 | A * | 2/1997 | Blizzard | D01F 8/02 264/210.8 |
| 5,683,259 | A | 11/1997 | Sato | |
| 6,009,930 | A * | 1/2000 | Jantschek | E04B 2/7431 160/352 |
| 6,188,051 | B1 * | 2/2001 | Kusek | H05B 3/10 219/544 |
| 6,337,443 | B1 | 1/2002 | Dlugas | |
| 6,836,603 | B1 | 12/2004 | Bocanegra | |
| 7,015,395 | B2 * | 3/2006 | Goldsworthy | H02G 15/18 174/113 C |
| 7,170,459 | B1 * | 1/2007 | McKim | H01Q 1/34 343/709 |
| 7,314,998 | B2 | 1/2008 | Amato et al. | |
| 8,308,505 | B2 | 11/2012 | Hatton et al. | |
| 8,692,116 | B2 | 4/2014 | Holland | |
| 8,772,640 | B2 | 7/2014 | Hatton et al. | |
| 8,792,996 | B2 * | 7/2014 | Sethna | A61N 1/05 607/122 |
| 9,053,837 | B2 | 6/2015 | Holland | |
| 9,431,151 | B2 | 8/2016 | Tatton et al. | |
| 9,470,021 | B2 * | 10/2016 | Kindstrand | E05B 67/003 |
| 10,176,908 | B2 * | 1/2019 | Tanaka | H01B 7/0009 |
| 10,272,400 | B2 * | 4/2019 | Staheli | B01F 27/11253 |
| 10,284,764 | B2 * | 5/2019 | Ihlenburg | H04N 7/183 |
| 10,438,727 | B2 | 10/2019 | Hatton | |
| 10,483,019 | B2 * | 11/2019 | Shen | H01B 3/18 |
| 10,892,567 | B2 * | 1/2021 | Gery | H01R 11/12 |
| 2002/0115336 | A1 * | 8/2002 | Gunreben | H01R 13/5829 439/468 |
| 2003/0091313 | A1 | 5/2003 | Paradiso | |
| 2004/0210282 | A1 * | 10/2004 | Flock | A61L 27/50 606/228 |
| 2007/0062721 | A1 | 3/2007 | Shatkin et al. | |
| 2008/0185168 | A1 * | 8/2008 | Matsukawa | H04M 1/0235 174/117 F |
| 2008/0199135 | A1 * | 8/2008 | Proulx | G02B 6/02347 65/385 |
| 2013/0311039 | A1 | 11/2013 | Washeleski | |
| 2019/0065921 | A1 | 2/2019 | Benkley | |
| 2020/0043636 | A1 | 2/2020 | Hatton | |

FOREIGN PATENT DOCUMENTS

| | | | | |
|---|---|---|---|---|
| JP | 11107160 A | | 4/1999 | |
| JP | 2003197039 A | * | 7/2003 | H01B 7/00 |

* cited by examiner

GUARDED COAXIAL CABLE ASSEMBLY

PRIORITY CLAIM AND INCORPORATION BY REFERENCE

This application is a continuation of U.S. patent application Ser. No. 16/594,785 filed Oct. 7, 2019, which is a continuation of U.S. patent application Ser. No. 15/249,446 filed Aug. 28, 2016 now U.S. Pat. No. 10,438,727, which is a continuation of U.S. patent application Ser. No. 14/269,105 filed May 3, 2014, now U.S. Pat. No. 9,431,151, which is a continuation of U.S. patent application Ser. No. 13/668,260 filed Nov. 3, 2012, now U.S. Pat. No. 8,772,640, which is a continuation of U.S. patent application Ser. No. 12/634,293 filed Dec. 9, 2009, now U.S. Pat. No. 8,308,505, all of which are entitled GUARDED COAXIAL CABLE ASSEMBLY and all of which are by this reference incorporated herein in their entireties and for all purposes.

BACKGROUND OF THE INVENTION

Field of the Invention

The present invention relates to an article of manufacture for conducting electrical signals. In particular, a guarded coaxial cable is provided for conducting radio frequency signals.

Discussion of the Related Art

Coaxial cables typically used for television including satellite, cable TV and antenna cables are typically 7 mm in diameter, a size large enough to limit signal loss over the distances traveled from an outside location to a location inside a home or building. Typically these cables originate outside a home or apartment such as a multiple dwelling unit (MDU) and terminate inside where TV, wireless, or satellite reception equipment is located.

A cable normally enters a building through a hole drilled in a wall. But, drilling a hole in a wall and routing a cable through the hole makes a permanent alteration to the building. Since MDU occupants typically do now own the premises, this simple action raises issues including unauthorized building modifications, ownership of the cable modifications, liability for changes and liability for related safety issues.

Wireless solutions do not solve this problem. While capacitive coupling solves the problem of transporting high frequency signals across a glass boundary, such wireless solutions are unable to transport mid and low frequency signals. In particular, cable and satellite television signals, electric powering of outdoor devices and low frequency control signals must be transported using electrical conductors such as coaxial cables.

A solution using the space between the windows or doors and their frame is well known. Here, cables are passed through an existing opening without modification to the building structure. But, using such openings to pass a typical 7 mm O.D. coaxial cable presents challenges including closing the window or door when it is blocked by the cable and maintaining a fully functional cable when it is deformed by impact and compression from operation of the window or door.

The gap between a window/door and its frame is typically less than the 7 mm size of the cable. In many windows and doors, the space provided for soft weather sealing material and/or the latching tolerance of the door/frame interface provides a gap on the order of about 3 mm. Therefore, a 7 mm coaxial cable in this application will likely be squeezed and damaged while a cable of 3 mm or smaller diameter will likely avoid damage.

Coaxial cable deformations are undesirable because they damage cable covering and abruptly change the coaxial cable conductor spacing. In particular, conductor spacing changes tend to change the characteristic impedance of the cable and reflect radio frequency power back toward the source, causing a condition called standing waves. The abrupt change in impedance acts as a signal bottleneck and may result in detrimental data delays and signal lock-ups found in satellite TV signal transmission systems.

Coaxial cable entry solutions face a variety of problems including one or more of: 1) traveling through a small space between the closed window/door and its frame; 2) destruction or degradation from impacts when windows or doors are operated; 3) functioning within its specifications, for example a DBS Satellite coaxial cable must maintain a minimum impedance matching of the RF signal (12 dB minimum return loss at 2150 MHz) in order for the home device to operate correctly; and 4) passing electric current such as a DC current to power an outside device and low frequency control signals when needed.

The present methods of solving these problems lie in the construction of an extension cable that can pass through the small space and have coaxial connectors at each end to re-fasten the larger 7 mm coaxial long distance transmission cable at each end. These methods include using coaxial cables with diameters in the range of 3-4 mm, using armor such as metallic armor and other armoring methods known to persons of ordinary skill in the art, and using flattened coaxial cable to provide a thin profile.

None of these methods provides a robust solution. The first method often fails to protect the cable since cables over 3 mm in diameter are larger than the typical available window/door to frame gaps. When the door or window is closed, these cables are deformed to varying degrees rendering them useless or degrading their RF performance. In addition, the outer covering on such cables is soft and easily breached by repeated operation of windows/doors.

The second method not only uses cables larger than 3 mm, it also prevents the cable from making sharp turns such as 90 degree bends typical of the window and door frame applications. Here, the minimum bending radius of the extender cable is unacceptably increased by the armor.

The third method using a flat/non-circular coaxial cable provides inferior RF performance even before it is installed. In addition, bending the flat coaxial cable in one or more sharp bends of window/door frames further distorts the cable cross-section and impairs signal transmission. Further, this solution requires a soft sheath for bends that can easily be breached by repetitive impacts from operation of windows/doors.

What is needed is a guarded coaxial cable assembly having features including one or more of the following: 1) a cable assembly providing good RF performance including meeting industry standards such as 10 dB return loss, for a 75 ohm impedance, at a highest frequency of about 2150 MHz; 2) the cable assembly safely passing DC currents up to about 1.5 amperes with acceptable and/or minimal loss; 3) the cable assembly able to make multiple 90 degree bends to fit into the door frame; and, 4) the cable assembly performing within its specifications despite repeated impacts from windows/doors.

While known solutions are widely employed and the cable and satellite television industry shows little interest in developing new solutions, the present invention offers significant advancements over what has been done before.

SUMMARY OF THE INVENTION

In the present invention, a guarded coaxial cable assembly includes a micro-coaxial cable and an adjacent rail or bumper member where at least a portion of the assembly can be deformed to assume and substantially maintain a plurality of different shapes.

In various embodiments the invention provides for one or more of an improved method of transporting RF signals, DC current, and low frequency control signals via a guarded coaxial cable assembly and transporting the same through a confined space such as the gap between doors/windows and an abutting frame member.

BRIEF DESCRIPTION OF THE DRAWINGS

The present invention is described with reference to the accompanying figures. These figures, incorporated herein and forming part of the specification, illustrate the invention and, together with the description, further serve to explain its principles enabling a person skilled in the relevant art to make and use the invention.

DETAILED DESCRIPTION OF THE PREFERRED EMBODIMENTS

The disclosure provided in the following pages describes examples of some embodiments of the invention. The designs, figures, and description are non-limiting examples of embodiments they disclose. For example, other embodiments of the disclosed device and/or method may or may not include the features described herein. Moreover, disclosed advantages and benefits may apply to only certain embodiments of the invention and should not be used to limit the disclosed invention.

To the extent parts, components and functions of the described invention exchange electric power or signals, the associated interconnections and couplings may be direct or indirect unless explicitly described as being limited to one or the other. Notably, parts that are connected or coupled may be indirectly connected and may have interposed devices including devices known to persons of ordinary skill in the art.

Figure 1:
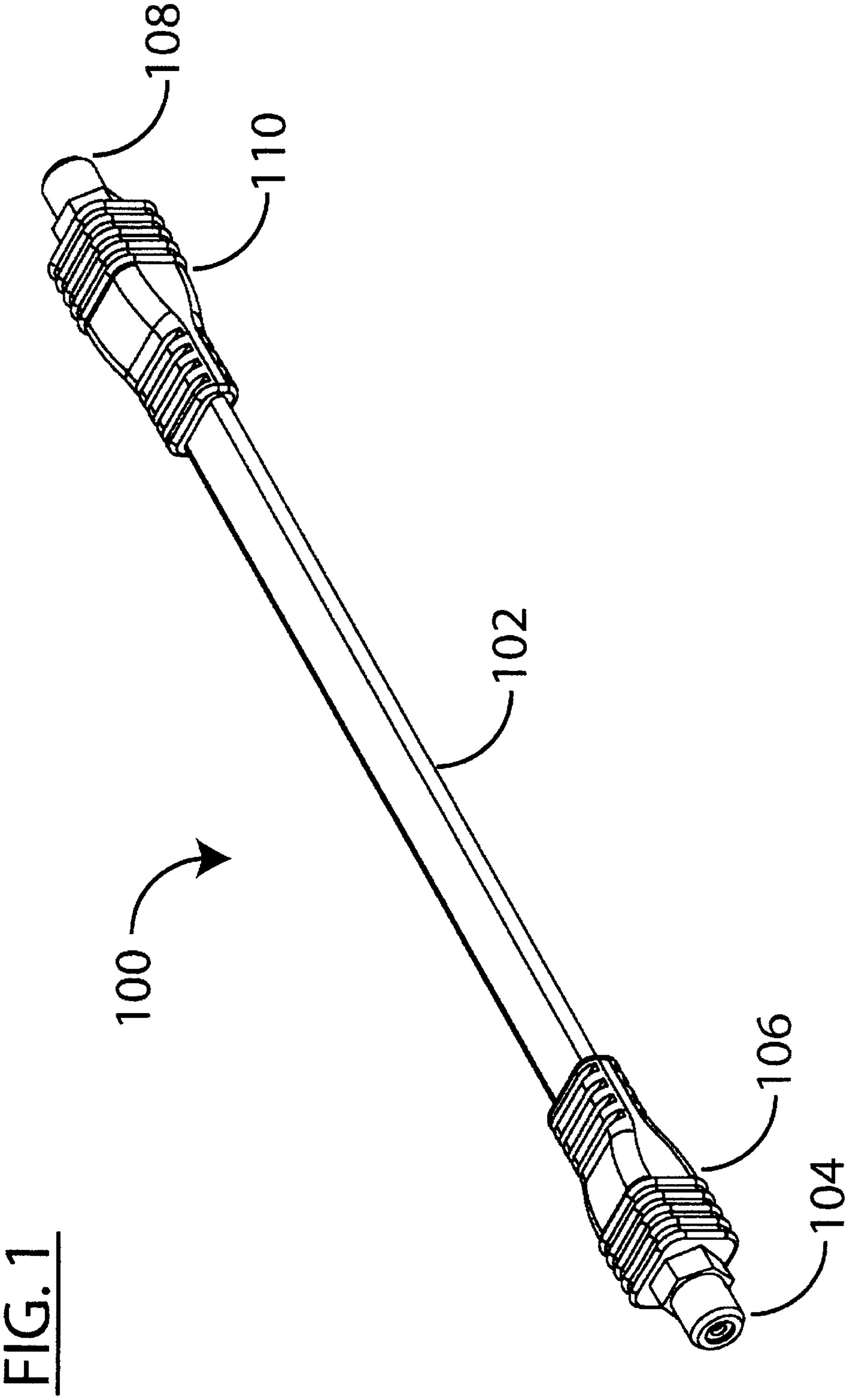
FIG. 1 shows a guarded coaxial cable assembly in accordance with the present invention.

FIG. 1 shows a guarded coaxial cable assembly in accordance with the present invention 100. A substantially flat cableway 102 interconnects with and extends between first and second connectors 104, 108. In some embodiments, over-moldings or boots 106, 110 surround an interface between each connector and the cableway. In some embodiments, auxiliary connectors 114, 118 with respective auxiliary leads 115, 117 are included.

Figure 2A:
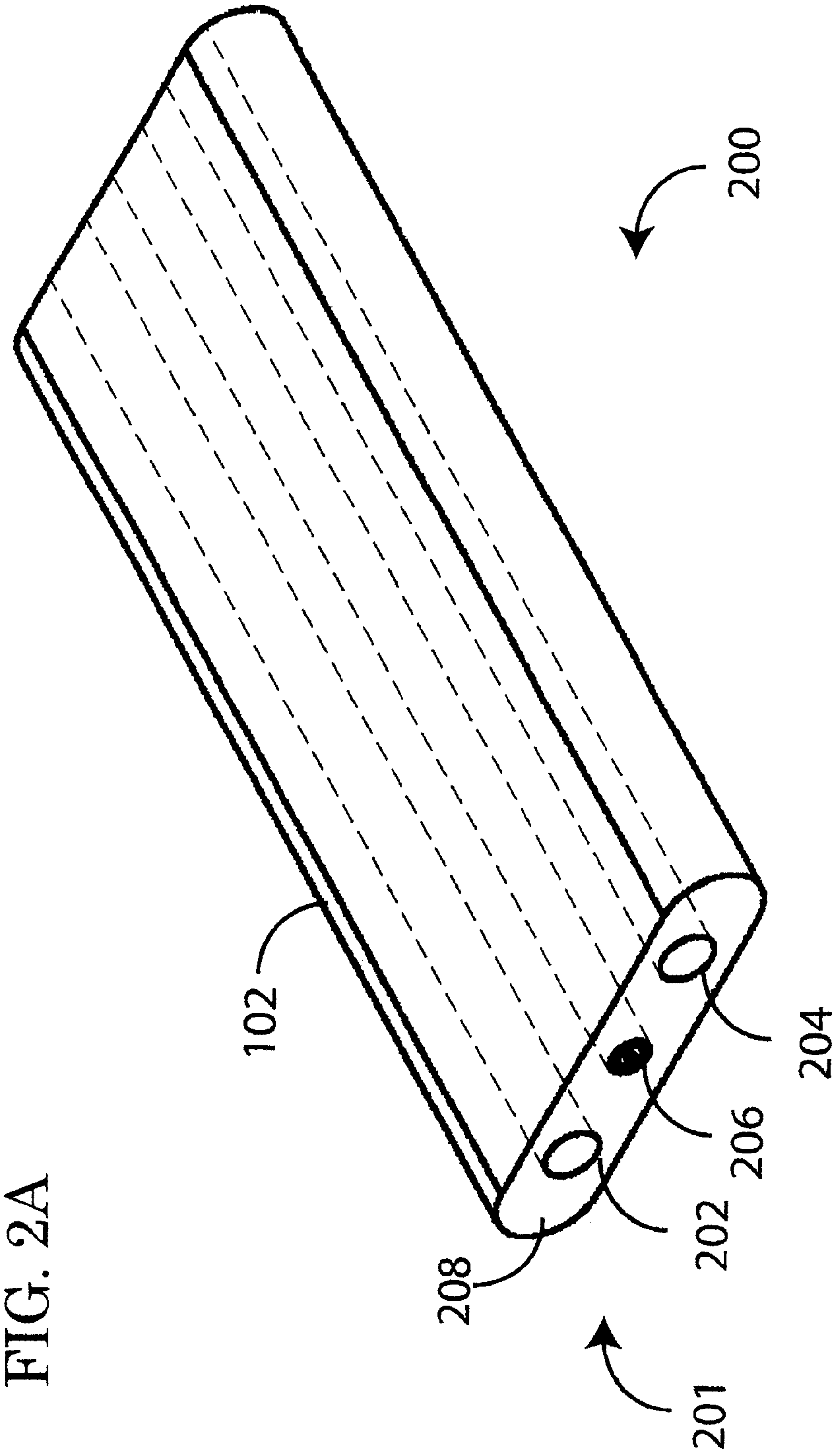
FIGS. 2A and 2B show section of the cableway of the guarded coaxial cable assembly of FIG. 1.

FIG. 2A shows a perspective view of a portion of the cableway 200. An exposed end of the cableway 201 reveals a cross-section including a micro-coaxial cable 206, two rails 202, 204 and an outer jacket or matrix 208. In some embodiments a single rail is used. In an embodiment, a centerline of the micro-coaxial cable lies substantially along an imaginary surface defined by a plurality of imaginary lines of shortest distance extending between the rails.

Any suitable coaxial cable connectors 104, 108 known to persons of ordinary skill in the art may be used with the micro-coaxial cable 206. In an embodiment, "F" type coaxial cable connectors are used. In other embodiments, BNC or RCA type connectors are used. In either case, the connectors may be male, female or mixed. In an embodiment, the guarded coaxial cable assembly includes female connectors on each end for interconnection with the male connectors of a larger feeder RF cable.

Figure 3:
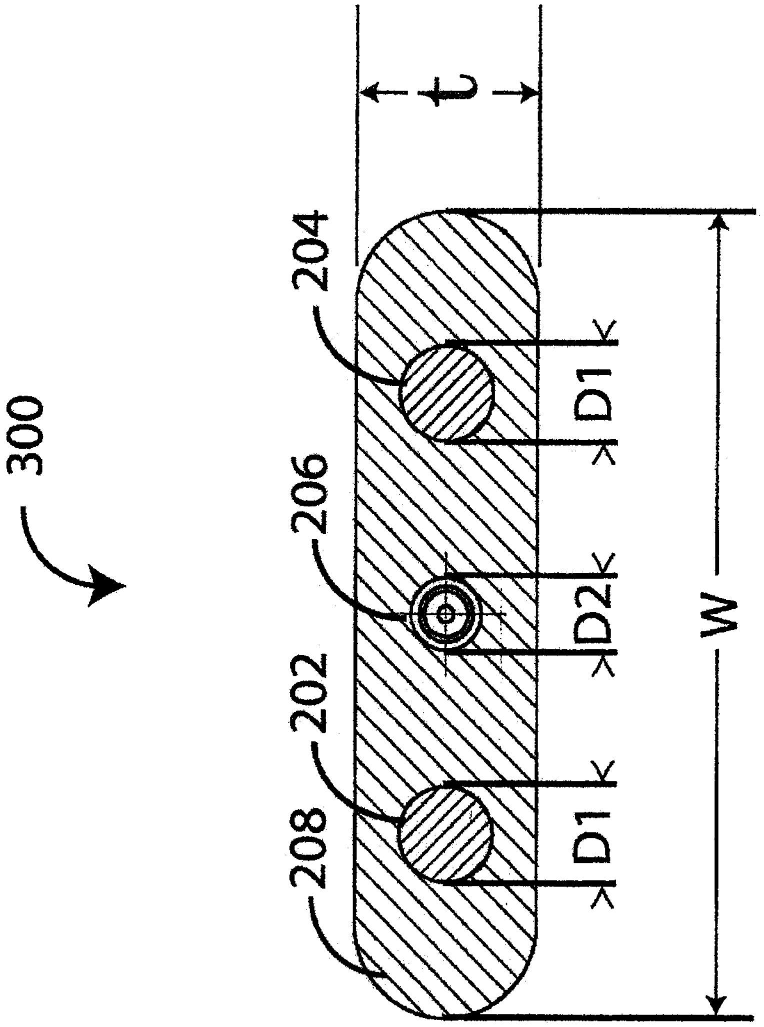
FIG. 3 shows an enlarged cross-section of the cableway of the guarded coaxial cable assembly of FIG. 1.

FIG. 3 shows an enlarged cross-sectional view of the cableway 300. In the embodiment shown, the cable jacket is substantially flat having a thickness "t" suitable for location in narrow passages such as between a door and a door jamb or a window and a window sill. In an embodiment, the cable jacket thickness is in the range of about 2 to 5 mm. And, in an embodiment, the cable jacket thickness is about 3 mm. The cableway width "w" is selected such that the outer jacket envelops the micro-coaxial cables and the rails. In an embodiment, the cable jacket is in the range of about $2\times(d1+d1+d2)$ to $5\times(d1+d1+d2)$ where d1 is the outer diameter of each rail and d2 is the outer diameter of the micro-coaxial cable 206. And, in an embodiment, the cable jacket width is in the range of about 10-14 mm. In yet another embodiment, the cable jacket width is about 12 mm.

Materials suited for use as cable jackets include flexible, non-conducting and abrasion resistant materials. A number of polymers, including one or more of rubber, silicon, PVC, polyethylene, neoprene, chlorosulphonated polyethylene, and thermoplastic CPE can be used.

Construction methods for integrating the cable jacket 208, rails 202, 204 and micro-coaxial cable 206 include any suitable method known to persons of ordinary skill in the art. In an embodiment, the cable jacket 208 envelops the rails and micro-coaxial cable as it is extruded from a die. In some embodiments (as shown), the jacket envelopes the rails and micro-coaxial cable and fills the spaces between them. In yet another embodiment, the assembly is molded such as by filling a mold holding the micro-coaxial cable and rail(s) with a fluid that will solidify and become the cable jacket. Suitable fluids include fluids useful in making the above the above polymers and other fluids useful for making suitable jacket materials and known to persons of ordinary skill in the art.

Figure 4:
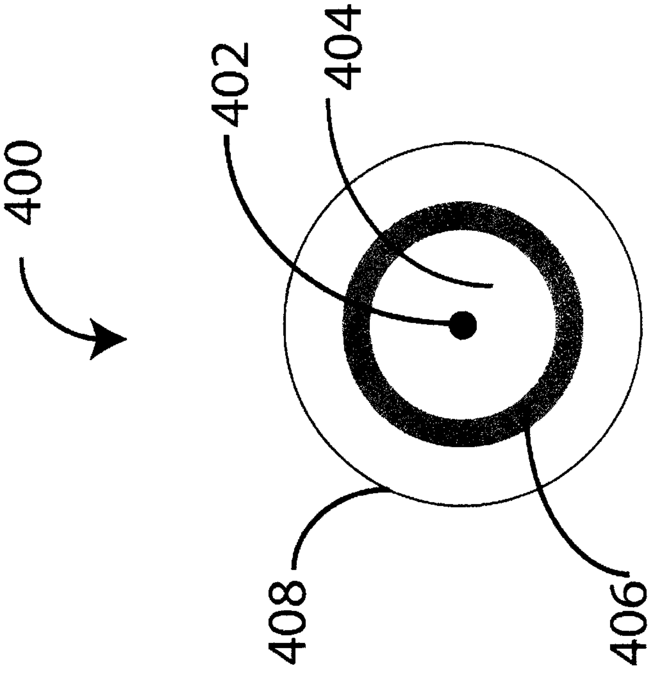
FIG. 4 shows an enlarged cross-section of a coaxial cable of the guarded coaxial cable assembly of FIG. 1.

FIG. 4 shows a cross-sectional view of the micro-coaxial cable 400. A dielectric material 404 separates a central conductor 402 and a conductive ground sheath 406 and the sheath is surrounded by a protective non-conducting outer jacket 408. The selected micro-coaxial cable should be appropriate for the intended service, such as cable TV or feeds from Direct Broadcast Satellite receiving dishes for example.

In an embodiment, the invention includes use of 75 ohm micro-coaxial cable having an outside diameter less than 2 mm which can make a 90 degree bend in a small space and maintain true coaxial performance. The micro cable is protected from radial impact and abrasion by a protective jacket.

Exemplary micro-coaxial cables include MCX™ brand cables sold by Hitachi Cable Manchester. In some embodiments the micro-coaxial cable outer jacket includes a non-stick material such as Teflon® promoting relative motion between the cable and the outer jacket 208.

Whether a single rail or two or more rails are used (two are shown) 202, 204, the rail(s) preferentially bear transverse loads applied to the cableway 102 and tend to prevent harmful compression of the micro-coaxial cable. In various embodiments, the diameter of the micro-coaxial cable d2 is greater than or equal to the diameter of the rails d1. In some of these embodiments the ratio of the diameters d2/d1 is in the range of about 1.0 to 2.0.

In various other embodiments (as shown) the diameter of the micro-coaxial cable d2 is chosen to be somewhat less than the diameter of the rails d1 for added protection. In some of these embodiments the ratio of diameters d1/d2 is in the about 1.0 to 2.0

Figure 5:
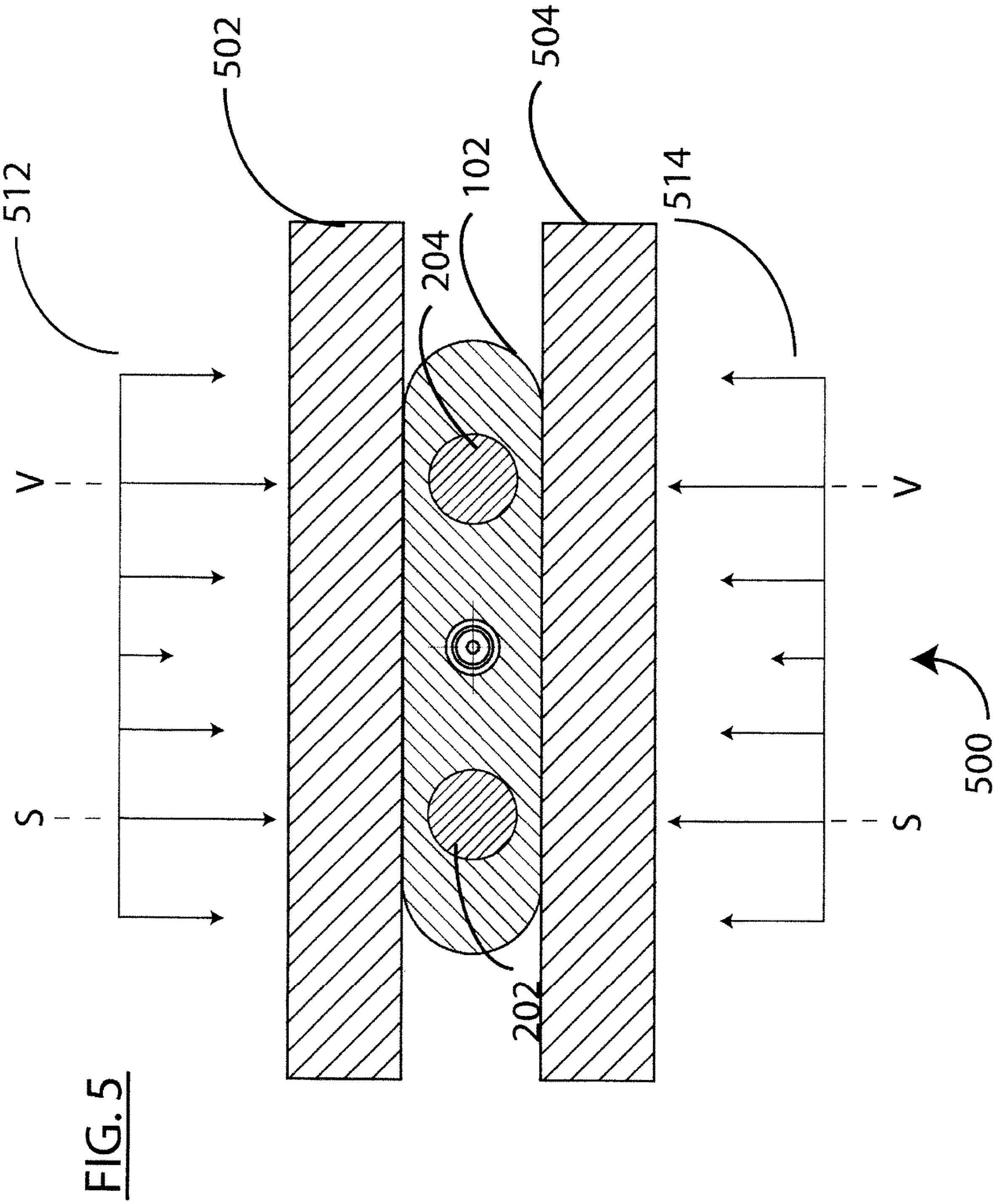
FIG. 5 shows forces applied to an enlarged cross-section of the cableway of the guarded coaxial cable assembly of FIG. 1.

FIG. 5 shows a portion of a cableway subjected to a load 500. In particular, the cableway 102 is squeezed between opposed passage parts 502, 504 tending to compress the cableway. Choosing rail materials that are relatively incompressible as compared to the cableway jacket materials results in most of the load being borne along and near lines s-s and v-v passing through the respective centers of the rails. An example of such a preferential force distribution is shown in opposed force profiles 512, 514.

Materials suited for rail construction are relatively incompressible as compared to cableway jacket materials. In some embodiments, rail construction materials are flexible. And, in some embodiments rail construction materials tend, at least partially, to retain deformed shapes such as an angular profile after being bent around a corner.

In various embodiments, rail construction materials include metals and metal alloys with one or more of iron, steel, copper, aluminum, tin, nickel and other metals known by persons of ordinary skill in the art to have suitable properties. In some embodiments, rail construction materials include non-metals such as polymers. For example, a segmented/articulated rail made from PVC can be used, the segments imparting flexibility and/or a tendency to retain, at least partially, a deformed shape.

Figure 2B:
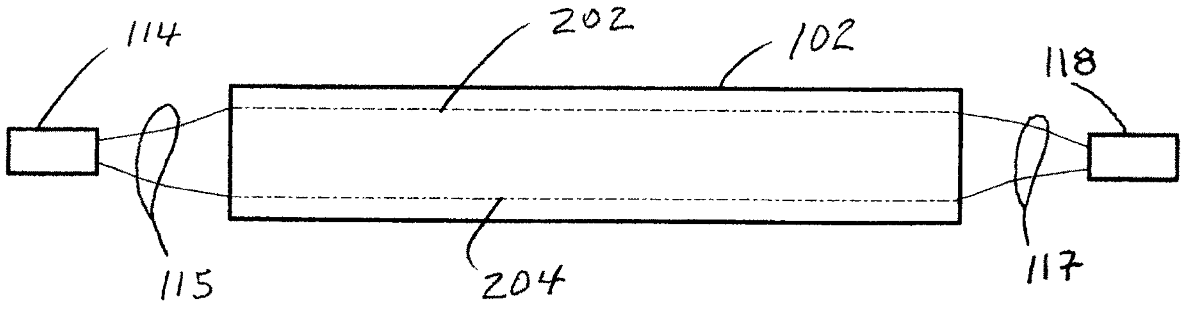

In embodiments with conductive rail materials, the rails can serve as conductors. As seen in FIG. 2B, some such embodiments use two conductive rails, the rails at one end of the guarded coaxial cable are interconnected via a lead 115 with a first electrical connector 114 and the rails at the other end of the guarded coaxial cable are interconnected via a lead 117 with a second electrical connector 118. As persons of ordinary skill in the art will understand, the power handling capability of the rails will be determined by their physical and material properties and the connectors will be chosen to suit the application.

Uses for guarded coaxial cable assemblies include passing through windows, doors and other confined spaces where an unprotected coaxial cable might otherwise be damaged. As discussed above, such protection is desirable for, inter alia, preserving signal quality. And, as discussed above various embodiments orient one or more rails 202, 204 and a micro-coaxial cable in a flat cableway 102 such that transverse loads applied to the cableway are preferentially borne by the rail(s).

Figure 6:
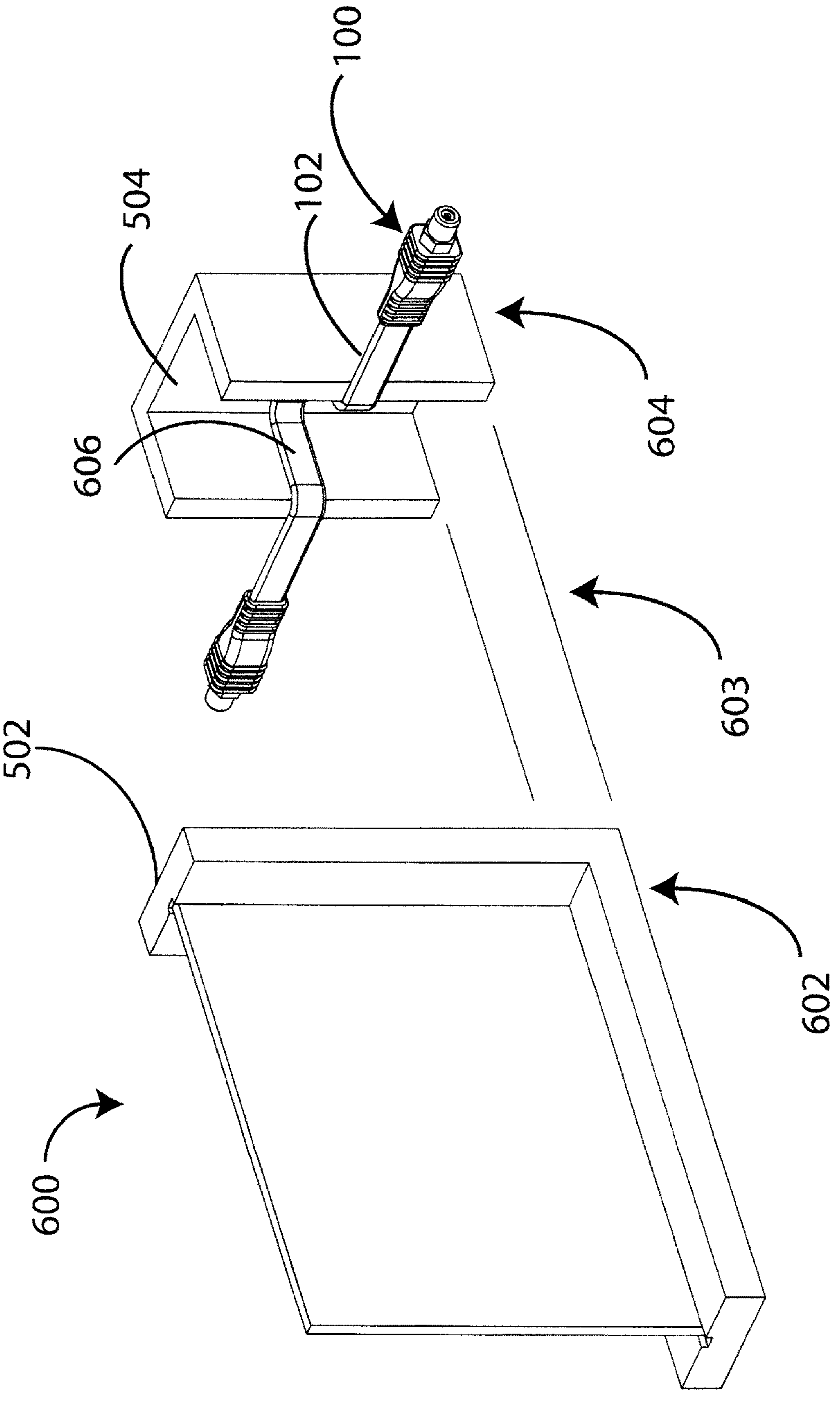
FIG. 6 shows the guarded coaxial cable assembly of FIG. 1 installed in a window or door frame.

FIG. 6 shows a guarded coaxial cable assembly installed in an open sliding window or door jamb 600. Here, the cable assembly passes between the opposed passage parts 502, 504 located on a respective sliding sash 602 and a fixed jamb 604. When the sash slides along a slide part 603, it presses a cableway section of the cable assembly 606 into a shape matching the "U" shaped profile of the confined space.

Figure 7:
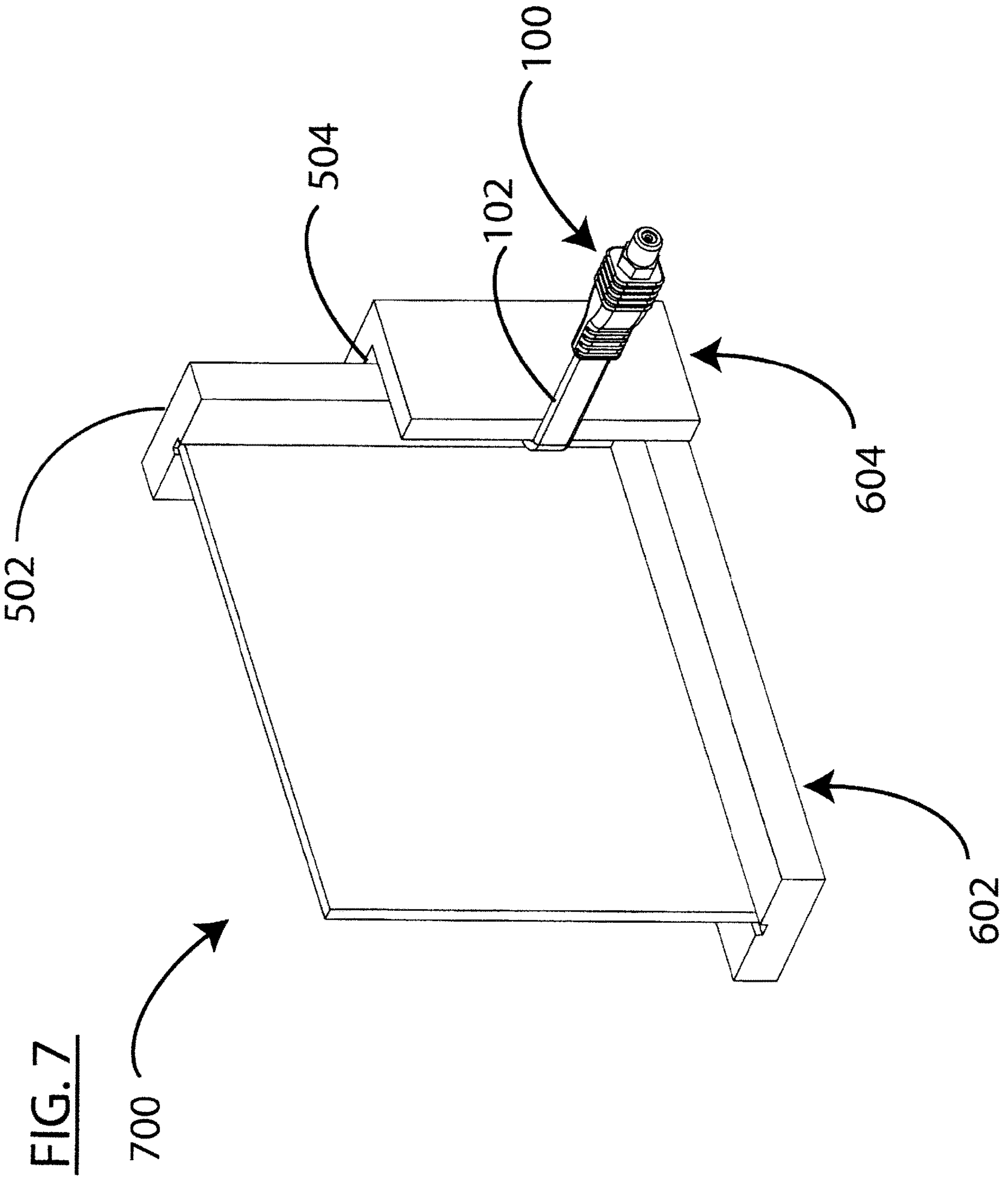
FIG. 7 shows the guarded coaxial cable assembly of FIG. 1 being squeezed by a closed window or door.

FIG. 7 shows a guarded coaxial cable assembly installed in a closed sliding window or door jamb 700. As described above in connection with FIG. 5, the rails 202, 204 of the cableway 102 guard the micro-coaxial cable 206 against compression and crushing due to closing the sash or door 602 and squeezing the cableway between the passage parts 502, 504.

While various embodiments of the present invention have been described above, it should be understood that they have been presented by way of example only, and not limitation. It will be apparent to skilled artisans that various changes in the form and details can be made without departing from the spirit and scope of the invention. As such, the breadth and scope of the present invention should not be limited by the above-described examples, but should be defined only in accordance with the following claims and equivalents thereof.

What is claimed is:

1. A guarded micro-coaxial cable comprises:

a non-conducting and flexible outer jacket;

the jacket having a cross-section including two opposed sides that are parallel and longer than adjoining sides;

about equidistant from the two opposed sides, a jacket centerline;

within the jacket a 75 ohm micro-coaxial cable capable of 90 degree bends for carrying radio frequency signals of upto 2150 MHz;

within the jacket a metal rail that protects the micro-coaxial cable from harmful compression;

a window sash or a door; and, the window sash or door mating with a frame;

wherein the rails resist micro-coaxial compression as the opposed sides are squeezed between the sash or door and the frame.

2. A guarded coaxial cable comprising:

a 75 ohm micro-coaxial cable having a center conductor, the micro-coaxial cable capable of 90 degree bends for carrying radio frequency signals of upto 2150 MHz;

the micro-coaxial cable extending between metal rails;

an external polymer jacket enclosing a length of the rails and micro-coaxial cable;

the jacket having first and second generally opposed surfaces for bearing transverse loads; and, the guarded coaxial cable substantially retains deformations as it makes 90 degree bends around obstructions.

* * * * *